United States Patent [19]

Hansen et al.

[11] Patent Number: 5,264,560
[45] Date of Patent: Nov. 23, 1993

[54] PREPARATION OF QUATERNIZED AZO DYES

[75] Inventors: Guenter Hansen, Ludwigshafen; Johannes P. Dix, Weisenheim; Helmut Reichelt, Neustadt; Clemens Grund, Mannheim, all of Fed. Rep. of Germany

[73] Assignee: BASF Aktiengesellschaft, Ludwigshafen, Fed. Rep. of Germany

[21] Appl. No.: 915,131

[22] Filed: Jul. 17, 1992

[30] Foreign Application Priority Data

Aug. 13, 1991 [DE] Fed. Rep. of Germany ....... 4126711

[51] Int. Cl.$^5$ .................. C09B 43/00; C09B 44/10; D06P 3/24; D06P 3/76
[52] U.S. Cl. ............................ 534/589; 534/604; 534/605; 534/606; 534/607; 534/611; 8/527
[58] Field of Search .............. 534/589, 604, 605, 606, 534/607, 611; 8/527, 657

[56] References Cited

U.S. PATENT DOCUMENTS

| 3,346,322 | 10/1967 | Finkenauer et al. | 8/657 X |
| 3,887,329 | 6/1975 | Hegar et al. | 534/604 X |
| 3,909,192 | 9/1975 | Gertisser | 8/657 X |
| 3,956,271 | 5/1976 | Blass et al. | 534/606 X |
| 3,991,043 | 11/1976 | Illy | 534/589 |
| 4,392,998 | 7/1983 | Kuhlthau | 534/589 |
| 4,997,918 | 3/1991 | Zink | 534/589 X |

*Primary Examiner*—Robert W. Ramsuer
*Assistant Examiner*—Fiona T. Powers
*Attorney, Agent, or Firm*—Oblon, Spivak, McClelland, Maier & Neustadt

[57] ABSTRACT

Quaternized azo dyes whose diazo components are derived from a five-membered nitrogen-containing aromatic aminoheterocycle and whose coupling components are derived from the aniline series are prepared by reacting to corresponding neutral dye-bases with an alkylating agent in γ-butyrolactone as inert diluent.

2 Claims, No Drawings

PREPARATION OF QUATERNIZED AZO DYES

The present invention relates to a novel process for preparing quaternized azo dyes whose diazo components are derived from a five-membered nitrogen-containing aromatic amino heterocycle and whose coupling components are derived from the aniline series by reacting the corresponding neutral dyebases with an alkylating agent in an inert diluent.

The preparation of basic dyes is known per se and is customarily effected by reacting a neutral, quaternizable chromophore, the so-called dyebase, with an alkylating agent.

The diluents used are in general N,N-dimethylformamide, toluene, chloroform and 1,1,1-trichloroethane.

However, these diluents have the disadvantage of incomplete biodegradability. Moreover, they are not suitable for use as medium for the quaternized azo dyes or they are unsuitable from an applicational hygiene point of view.

It is an object of the present invention to make available a novel process for preparing quaternized azo dyes by reacting the corresponding neutral, quaternizable dyebases with an alkylating agent using a diluent which on the one hand shall be readily biodegradable and on the other shall be suitable for use as medium for the resulting quaternized dye.

We have found that this object is achieved by a process for preparing a quaternized azo dye of the formula I

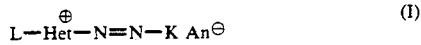

where

An$^\ominus$ is one equivalent of an anion,

L is $C_1$–$C_4$-alkyl,

Het is a five-membered aromatic heterocycle which may be benzofused and contains at least one nitrogen atom and 1 or 2 further hetero atoms selected from the group consisting of nitrogen, oxygen and sulfur and to which the radical L is attached at a nitrogen atom, and K is the radical of a coupling component of the aniline series, by reacting the neutral dyebase of formula II

where Het and K are each as defined above, with an alkylating agent of the formula III

where L is as defined above and X is a leaving group, in γ-butyrolactone as inert diluent.

Suitable diazo components Het-NH$_2$ from which the radical Het in the formula II is derived are for example the basic structures aminopyrazole, aminoimidazole, aminooxazole, aminoisoxazole, aminothiazole, aminoisothiazole, amino-1,2,4-triazole, amino-1,2,4-oxadiazole, amino-1,3,4-oxadiazole, amino-1,2,4-thiadiazole, amino-1,3,4-thiadiazole or benzofused derivatives thereof, such as aminoindazole, aminobenzimidazole, aminobenzoxazole, aminobenzisoxazole, aminobenzothiazole and aminobenzisothiazole.

If allowed by the substitution pattern, the aminoheterocycles mentioned may contain further substituents, for example $C_1$–$C_4$-alkyl, phenyl, $C_1$–$C_4$-alkoxy, halogen, in particular chlorine and bromine, or mono- or di-$C_1$–$C_4$-alkylamino.

Of particular suitability are heterocycles of the aminoisothiazole, aminoindazole or aminobenzothiazole series.

Of very particular suitability are for example 5-amino-3-methyl-4-chloroisothiazole, 5-amino-3-methyl-5-bromoisothiazole, 3-aminoindazole, 3-amino-1-methylindazole, 2-aminobenzothiazole and 2-amino-6-methoxybenzothiazole.

The radical K of the coupling component is derived for example from anilines KH of the formula IV

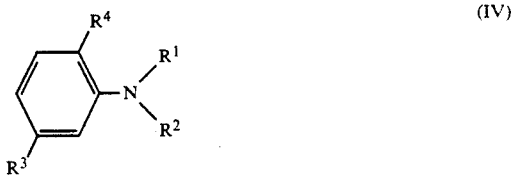

where $R^1$ and $R^2$ are identical or different and each is independently of the other hydrogen, $C_1$–$C_8$-alkyl, which may be interrupted by one or two oxygen atoms in ether function and may be $C_1$–$C_8$-alkoxycarbonyl-, cyano-, hydroxyl-, $C_1$–$C_4$-alkyloxy-, benzoyloxy- or phenoxy-substituted, $C_3$–$C_5$-alkenyl, $C_5$–$C_7$-cycloalkyl or phenyl, which may be monosubstituted or disubstituted by chlorine, methyl, ethoxy, dimethylamino or acetylamino, $R^3$ is hydrogen, $C_1$–$C_4$-alkyl $C_1$–$C_4$-alkoxy, chlorine, $C_1$–$C_4$-alkanoylamino, ureido, mono- or di-$C_1$–$C_4$-alkylureido or $C_1$–$C_4$-alkylsulfonylamino, and $R^4$ is hydrogen, $C_1$–$C_4$-alkyl, $C_1$–$C_4$-alkoxy or chlorine.

Examples of suitable radicals $R^1$ and $R^2$ are hydrogen, methyl, ethyl, propyl, isopropyl, butyl, isobutyl, sec-butyl, pentyl, neopentyl, isopentyl, tertpentyl, hexyl, heptyl, octyl, 2-ethylhexyl, allyl, methallyl, cyclopentyl, cyclohexyl, cycloheptyl, benzyl, 1- or 2-phenylethyl, 2-hydroxyethyl, 2-cyanoethyl, 2- or 3-hydroxypropyl, 2- or 3-cyanopropyl, 1-methyl-2-hydroxyethyl, 2-hydroxybutyl, 1-ethyl-2-hydroxyethyl, 4-hydroxybutyl, 2-acetoxyethyl, 2-propionyloxyethyl, 2-acetoxybutyl, 4-acetoxybutyl, 2-propionyloxybutyl, 2-benzoyloxyethyl, 3-acetoxypropyl, 2-(4-methylbenzoyloxy)ethyl), 2-(3-methylbenzoyloxy)ethyl, 2- or 3-benzoyloxypropyl, 2- or 4-benzoyloxybutyl, methoxycarbonylmethyl, ethoxycarbonylmethyl, propoxycarbonylmethyl, butoxycarbonylmethyl, 2-methoxycarbonylethyl, 2-ethoxycarbonylethyl, 2-propoxycarbonylethyl, 2-butoxycarbonylethyl, 2-secbutoxycarbonylethyl, 2-(2-ethylhexyloxycarbonyl)ethyl, 2-methoxyethyl, 2-ethoxyethyl, 2-propoxyethyl, 2-butoxyethyl, 2-phenoxyethyl, 2-(4-acetoxybutoxy)ethyl, 2-methoxypropyl, 2-ethoxypropyl, 2-propoxypropyl, 1-methyl-2-methoxyethyl, 3-methoxypropyl, 3-ethoxypropyl, 2-butoxypropyl, 6-phenoxy-4-oxahexyl, 2-ethoxy-4-oxahexyl, 3-benzyloxypropyl, 2-, 3- or 4-chlorophenyl, 2-, 3- or 4-methylphenyl, 2-, 3- or 4-methoxyphenyl, 2-ethoxyphenyl,2,4-dichlorophenyl,4-dimethylaminophenyl and 4-acetylaminophenyl.

$R^3$ and $R^4$ are each for example hydrogen, chlorine, methyl, ethyl, propyl, isopropyl, butyl, isobutyl, secbutyl, methoxy, ethoxy, propoxy, isopropoxy, butoxy or sec-butoxy.

$R^3$ may also be for example acetylamino, propionylamino, butyrylamino, isobutyrylamino, benzoylamino, methylureido, butylureido, N,N-dimethylureido, methylsulfonylamino, ethylsulfonylamino, propylsulfonylamino or butylsulfonylamino.

L is for example methyl, ethyl, propyl, isopropyl, butyl, isobutyl or sec-butyl.

Suitable leaving groups X are for example halogens, chloride, bromide or iodide, methosulfate, ethosulfate, methanesulfonate, benzenesulfonate and o- or p-toluenesulfonate.

Suitable anions $A^\ominus$ are for example the anions mentioned above under X and also acetate, sulfate and hydrogensulfate.

The use of dimethyl sulfate or diethyl sulfate as alkylating agent is preferred, dimethyl sulfate being particularly preferred.

Particular preference is given to a process where the quaternizable dyes used are those of the formula V

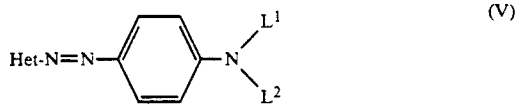

where

Het is isothiazolyl, indazolyl or benzothiazolyl, which may each be substituted by $C_1$–$C_4$-alkoxy or halogen, and $L^1$ and $L^2$ are identical or different and each is independently of the other $C_1$–$C_6$-alkyl, which may be substituted by hydroxyl or cyano.

Of particular suitability here are those dyes of formula V where Het is a radical of the formula

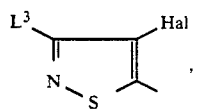

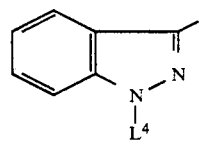

or

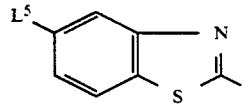

where $L^3$ is hydrogen or $C_1$–$C_4$-alkyl, $L^4$ is hydrogen or $C_1$–$C_4$-alkyl, $L^5$ is hydrogen, $C_1$–$C_4$-alkyl or $C_1$–$C_4$-alkoxy, and Hal is chlorine or bromine.

The process of the present invention is advantageously carried out by first introducing the γ-butyrolactone as diluent into a stirred apparatus, then adding the neutral dyebase of the abovementioned formula II at from 75° to 100° C, and finally, at from 80° to 90° C., with stirring, starting with the addition of the alkylating agent of the formula III, which will in general take from 0.5 to 1.5 hours. This is followed, at from 80° to 90° C., by a post addition stirring phase which in general takes from 3 to 7 hours.

The molar ratio of alkylating agent III to dyebase II is in general 1:2.5, preferably 1:1.9.

For each part by weight of dyebase II there will in general be used from 0.3 to 0.9 part by weight of γ-butyrolactone.

After the reaction has ended, the reaction mixture is admixed at 40°–60° C. with from 50 to 100% by weight of water, based on the weight of the reaction mixture, and heated with stirring at from 50° to 100° C. for from 0.5 to 1 hour. This serves to destroy excess alkylating agent.

The resulting solution of quaternized dye I in γ-butyrolactone is already usable. However, it may be adjusted to specific color strength values by further diluting it, for example with water or acetic acid.

The process of the present invention gives the target products in high yield and purity. The diluent employed in the process is readily biodegradable and, what is more, has the advantage that it is highly suitable for use as medium for the quaternized dyes; i.e., the reaction solutions obtained in the process of the present invention are directly ready-to-use. There is no need for diluent exchange.

The quaternized dyes of the formula I are useful for dyeing polyamide or polyacrylonitrile fabric.

The invention will now be more particularly described by way of example.

EXAMPLE 1

147 g of γ-butyrolactone were heated to 85°–90° C. and during the heating-up phase 335 g (1 mol) of the dye of the formula

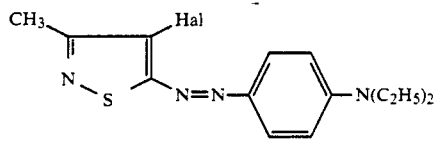

(Hal: 60% by weight Br and 40% by weight Cl)

were added. Then 238 g (1.88 mol) of dimethyl sulfate were added dropwise at 80°–90° C. in the course of one hour, and the mixture was subsequently -stirred at the stated temperature for 5 hours.

The mixture was then cooled down to 50° C., admixed with 500 ml of water and subsequently stirred at 70° C. for 45 minutes to destroy excess dimethyl sulfate. Then 35 g of active charcoal were added and the mixture was filtered.

The resulting solution of the dye of the formula

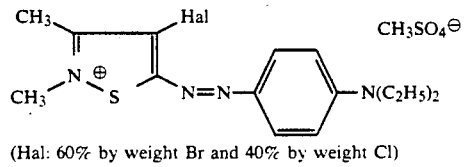

(Hal: 60% by weight Br and 40% by weight Cl)

is ready-to-use. To adjust it to a specific color strength it was diluted with 317 g of acetic acid and 387 g of water. The resulting solution dyes polyacrylonitrile fabric in a blue shade.

The same method gives the following dyes:

| Example No. | Dye | | Hue on polyacrylonitrile fabric |
|---|---|---|---|
| 2 | 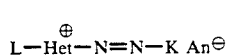 | $CH_3SO_4^{\ominus}$ | violet |
| 3 | | $CH_3SO_4^{\ominus}$ | blue |
| 4 | | $CH_3SO_4^{\ominus}$ | blue |

We claim:

1. A process for preparing a quaternized azo dye of the formula I $$L—\overset{\oplus}{Het}—N=N—K \; An^{\ominus} \quad (I)$$

where
- $An^{\ominus}$ is one equivalent of an anion,
- L is $C_1$-$C_4$-alkyl,
- Het is a five-membered aromatic heterocycle which may be benzofused and contains at least one nitrogen atom and 1 or 2 further hetero atoms selected from the group consisting of nitrogen, oxygen and sulfur and to which the radical L is attached at a nitrogen atom, and
- K is the radical of a coupling component of the aniline series, by reacting the neutral dyebase of formula II $$Het—N=N—K \quad (II)$$

where Het and K are each as defined above, with an alkylating agent of the formula III $$L—X \quad (III)$$

where L is as defined above and X is a leaving group, in γ-butyrolactone as inert diluent.

2. A process as claimed in claim 1, wherein the alkylating agent used is dimethyl sulfate or diethyl sulfate.

* * * * *